US011372845B2

(12) United States Patent
Shrivastava et al.

(10) Patent No.: US 11,372,845 B2
(45) Date of Patent: Jun. 28, 2022

(54) IN-PLACE LOAD UNIT CONVERSION

(71) Applicant: SAP SE, Walldorf (DE)

(72) Inventors: Deepak Shrivastava, Pune (IN);
Chaitanya Gottipati, Pune (IN); Colin Florendo, Marlborough, MA (US);
Rolando Blanco, Waterloo (CA);
Michael Muehle, Walldorf (DE);
Awisha Makwana, Pune (IN)

(73) Assignee: SAP SE, Walldorf (DE)

( * ) Notice: Subject to any disclaimer, the term of this patent is extended or adjusted under 35 U.S.C. 154(b) by 119 days.

(21) Appl. No.: 16/893,703

(22) Filed: Jun. 5, 2020

(65) Prior Publication Data
US 2020/0387486 A1 Dec. 10, 2020

Related U.S. Application Data

(60) Provisional application No. 62/858,693, filed on Jun. 7, 2019.

(51) Int. Cl.
*G06F 16/23* (2019.01)
*G06F 16/22* (2019.01)
(Continued)

(52) U.S. Cl.
CPC ........ *G06F 16/2379* (2019.01); *G06F 3/0604* (2013.01); *G06F 3/064* (2013.01);
(Continued)

(58) Field of Classification Search
CPC .. G06F 16/221; G06F 9/4843; G06F 16/2379; G06F 3/0604; G06F 16/2219;
(Continued)

(56) References Cited

U.S. PATENT DOCUMENTS 9,817,858 B2    11/2017   Eisenreich et al.
9,852,169 B2    12/2017   Faerber et al.
(Continued)

OTHER PUBLICATIONS

Abadi, S. et al., "The Design and Implementation of Modern Column-Oriented Database Systems," Foundations and Trends in Databases, vol. 5, No. 3, Now Publishers Inc., 2012, pp. 177-280.
(Continued)

*Primary Examiner* — Dangelino N Gortayo
(74) *Attorney, Agent, or Firm* — Sterne, Kessler, Goldstein & Fox P.L.L.C.

(57) ABSTRACT

Disclosed herein are system, method, and computer program product embodiments for converting column loadable data in a database into a page loadable format. When a column oriented in-memory database needs to perform an operation on a table, the affected columns must be loaded fully into memory. In some cases, a database may partition tables, allowing for column fragments corresponding to those partitions to be loaded into memory. These column fragments may exceed available memory, such that it is beneficial to convert the column fragment into a page loadable format. Approaches are discussed herein for performing the conversion without the need to update global metadata during the process, allowing for multiple parallel column fragments to be updated, allowing data manipulation language (DML) operations to continue on the column during the conversion process, and reducing the impact of blocked parallel savepoint operations during the conversion process by chunking the conversion process.

20 Claims, 6 Drawing Sheets

(51) Int. Cl.
| | |
|---|---|
| G06F 16/2455 | (2019.01) |
| G06F 12/02 | (2006.01) |
| G06F 3/06 | (2006.01) |
| G06F 12/0882 | (2016.01) |
| G06F 12/0875 | (2016.01) |
| G06F 9/48 | (2006.01) |

(52) U.S. Cl.
CPC .......... *G06F 3/0673* (2013.01); *G06F 9/4843* (2013.01); *G06F 12/0223* (2013.01); *G06F 12/0246* (2013.01); *G06F 12/0875* (2013.01); *G06F 12/0882* (2013.01); *G06F 16/221* (2019.01); *G06F 16/2219* (2019.01); *G06F 16/2228* (2019.01); *G06F 16/2237* (2019.01); *G06F 16/2255* (2019.01); *G06F 16/2272* (2019.01); *G06F 16/2282* (2019.01); *G06F 16/24552* (2019.01); *G06F 16/24558* (2019.01); *G06F 2212/1024* (2013.01); *G06F 2212/1044* (2013.01)

(58) Field of Classification Search
CPC ............. G06F 16/2228; G06F 16/2237; G06F 16/2255; G06F 16/2272; G06F 16/2282; G06F 16/24552; G06F 16/24558
See application file for complete search history.

(56) References Cited

U.S. PATENT DOCUMENTS

| | | | | |
|---|---|---|---|---|
| 2012/0131038 | A1* | 5/2012 | Aronovich | G06F 11/2023 707/769 |
| 2015/0088813 | A1* | 3/2015 | Lahiri | G06F 16/211 707/803 |
| 2015/0213072 | A1* | 7/2015 | Chen | G06F 16/221 707/693 |
| 2016/0012089 | A1 | 1/2016 | Sherkat et al. | |
| 2017/0031975 | A1* | 2/2017 | Mishra | G06F 16/2393 |
| 2017/0031976 | A1* | 2/2017 | Chavan | G06F 16/2255 |
| 2017/0322960 | A1 | 11/2017 | Glebe et al. | |
| 2018/0218016 | A1* | 8/2018 | Chen | H03M 7/60 |
| 2020/0142868 | A1* | 5/2020 | Varadarajan | G06F 3/0607 |

OTHER PUBLICATIONS

Aken, D.V. et al., "Automatic Database Management System Tuning Through Large-scale Machine Learning," ACM SIGMOD '17, May 14-19, 2017, pp. 1009-1024.
Alexiou, K. et al. "Adaptive Range Filters for Cold Data: Avoiding Trips to Siberia," Proc. of the VLDB Endowment, vol. 6, No. 14, 2013, pp. 1714-1725.
Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.
Andrei, M. et al., "SAP HANA Adoption of Non-Volatile Memory," Proc. of the VLDB Endowment, vol. 10, No. 12, 2017, pp. 1754-1765.
Anh, V.N. and Moffat, A., "Index compression using 64-bit words," Software—Practice and Experience, vol. 40, 2010, pp. 131-147.
Arulraj, J. et al., "Multi-Tier Buffer Management and Storage System Design for Non-Volatile Memory," arXiv:1901.10938v1 [cs.DB], Jan. 30, 2019, 17 pages.
Belazzougui, D. et al., "Hash, displace, and compress," Algorithms— ESA 2009, Proc. 17th Annual European Symposium, Copenhagen, Denmark, Sep. 7-9, 2009, pp. 682-603.
Bhattacharjee, B. et al., "Efficient Index Compression in DB2 LUW," VLDB '09, vol. 2, No. 2, 2009, pp. 1462-1473.
Do, J. et al., "Turbocharging DBMS Buffer Pool Using SSDs," ACM SIGMOD, 2011, pp. 1113-1124.

Eldawy, A. et al., "Spatial Partitioning Techniques in SpatialHadoop," Proc. of the VLDB Endowment, vol. 8, No. 12, 2015, pp. 1602-1605.
Elghandour, I. et al., "An XML Index Advisor for DB2," ACM SIGMOD'08, Jun. 9-12, 2008, 4 pages.
Finkelstein, S. et al., "Physical Database Design for Relational Databases," ACM Trans. on Database Systems, vol. 13, No. 1, Mar. 1988, pp. 91-128.
Graefe, G. et al., "In-memory Performance for Big Data," Proc. of the VLDB Endowment, vol. 8, No. 1, 2014, pp. 37-48.
Graefe, G., "Volcano—An Extensible and Parallel Query Evaluation System," IEEE Trans. on Knowledge and Data Engineering, vol. 6, No. 1, Feb. 1994, pp. 120-135.
Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.
Lang, H. et al., Data Blocks: Hybrid OLTP and OLAP on Compressed Storage using both Vectorization and Compilation. ACM SIGMOD, 2016, pp. 311-326.
Larson, P. et al., "Real-Time Analytical Processing with SQL Server," Proc. of the VLDB Endowment, vol. 8, No. 12, Aug. 31-Sep. 4, 2015, pp. 1740-1751.
Lee, J. et al., "Hybrid Garbage Collection for Multi-Version Concurrency Control in SAP HANA," ACM SIGMOD, Jun. 26-Jul. 1, 2016, pp. 1307-1318.
Leis, V. et al., "LeanStore: In-Memory Data Management Beyond Main Memory," IEEE ICDE, 2018, pp. 185-196.
Lemke, C. et al., "Speeding Up Queries in Column Stores—A Case for Compression," DAWAK, 2010, pp. 117-129.
Liu, X. and Salem, K., "Hybrid Storage Management for Database Systems," Proc. of the VLDB Endowment, vol. 6, No. 8, Aug. 26-30, 2013, pp. 541-552.
Majewski, B.S. et al., "A Family of Perfect Hashing Methods," The Computer Journal, vol. 39, No. 6., 1996, pp. 547-554.
May, N. et al., "SAP HANA—The Evolution of an In-Memory DBMS from Pure OLAP Processing Towards Mixed Workloads," BTW, 2017, pp. 545-563.
Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.
Müller, I. et al., "Adaptive String Dictionary Compression in In-Memory Column-Store Database Systems," Open Proceedings, 10.5441/002/edbt.2014.27, 2014, pp. 283-294.
Müller, I. et al., "Retrieval and Perfect Hashing Using Fingerprinting," J. Gudmundsson and J. Katajainen (Eds.), SEA 2014: Experimental Algorithms, Springer International Publishing, 2014, pp. 138-149.
Nehme, R. and Bruno, N., "Automated Partitioning Design in Parallel Database Systems," In ACM SIGMOD, 2011, pp. 1137-1148.
Neumann, T., Efficiently Compiling Efficient Query Plans for Modern Hardware, Proc. of the VLDB Endowment, vol. 4, No. 9, 2011, pp. 539-550.
Nica, A. et al., "Statisticum: Data Statistics Management in SAP HANA," Proc. of the VLDB Endowment, vol. 10, No. 12, 2017, pp. 658-1669.
On, S.T. et al., "FD-Buffer: A Buffer Manager for Databases on Flash Disks," ACM CIKM ' 10, Oct. 25-29, 2010, pp. 1297-1300.
Oracle® Database—Database In-Memory Guide, 19c, E96137-03, downloaded from https://docs.oracle.com/en/database/oracle/oracle-database/19/inmem/, Copyright 2016, 2020, 255 pages.
Pathak, A. et al., "Adaptive storage and access for simplified data management," *DaMoN '19*, Jul. 1, 2019, 6 pages.
Plaisance, J. et al., "Vectorized VByte Decoding," 1st Int'l Symp. on Web AlGorithms, Jun. 2015, 7 pages.
Plattner, H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.
Poess, M. and Potapov, D., "Data Compression in Oracle," Proc. of the VLDB Conference, 2003, pp. 937-947.

(56) References Cited

OTHER PUBLICATIONS

Sacco, G.M. and Schkolnick, M., "A Mechanism for Managing the Buffer Pool in a Relational Database System Using the Hot Set Model," Proc. of the Eighth Int'l. Conf. on Very Large Data Bases, Sep. 1982, pp. 257-262.
Sherkat, R. et al., "Page As You Go: Piecewise Columnar Access In SAP HANA," ACM SIGMOD '16, Jun. 26-Jul. 1, 2016, pp. 1295-1306.
Stoica, R. and Ailamaki, A., Enabling Efficient OS Paging for Main-Memory OLTP Databases. ACM DaMoN '13. 2013, 7 pages, 2013.
Willhalm, T. et al., "Vectorizing Database Column Scans with Complex Predicates," ADMS 2013, pp. 1-12.
Xie, D. et al., "Simba: Efficient In-Memory Spatial Analytics," ACM SIGMOD '16, Jun. 26-Jul. 1, 2016, pp. 1071-1085.
Zilio, D.C. et al., "DB2 Design Advisor: Integrated Automatic Physical Database Design," Procs. of the 30$^{th}$ VLDB Conference, 2004, pp. 1087-1097.

* cited by examiner

IN-PLACE LOAD UNIT CONVERSION

CROSS-REFERENCE TO RELATED APPLICATIONS

This application claims the benefit of U.S. Provisional Application No. 62/858,693, filed on Jun. 7, 2019, the contents of which are incorporated herein in their entirety.

BACKGROUND

When database queries are performed on data from a database, it is typically advantageous to load the data into memory and perform the query on the in-memory data. Unfortunately, this becomes challenging for larger database tables, as memory constraints may limit the number of tables that may be held in memory for rapid processing.

It may be beneficial to store some of the table data in a paged format, so that only specific pages that are needed to answer database queries are held in memory. This allows a subset of the data to remain in memory, with all of the advantages that apply to processing queries that need that subset of the data.

Accordingly, what is needed are approaches for converting data in a database to a paged format.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
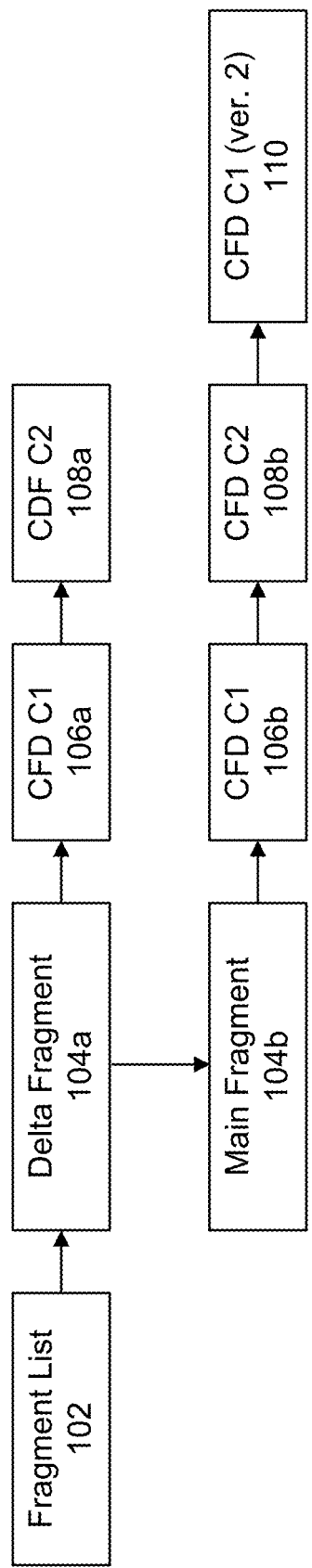
FIG. 1 illustrates a column store architecture 100, in accordance with an embodiment.

Provided herein are system, apparatus, device, method and/or computer program product embodiments, and/or combinations and sub-combinations thereof, for converting column-loadable data in a database to a page-loadable format.

In-memory databases provide exceptional speed when querying data, as operations can be performed on data held in memory rather than on a disk. However, as the sizes of these data stores grow larger, their size can outpace and overwhelm the memory available to load the data.

In column-store databases, the data in a table is stored on disk in a column-by-column format. As a result, in an embodiment, it is possible to load only those columns that are needed for a set of queries into memory, reducing some memory capacity requirements. However, even those columns may grow large enough that the necessary columns to perform a query use up too much memory to perform in-memory operations on them.

Data for these columns is typically persisted to disk as a binary dump of the data for the column in order—each element in the column is written to disk, followed by the next one, and so on—so that the data can also be rapidly read sequentially into memory for access. And, likewise, when changes are made to the data in memory, it can be again persisted to disk by writing the entire column back to disk sequentially. One skilled in the relevant arts will appreciate that other approaches may be used for such column loadable formats, and that this approach is exemplary.

For a table having columns in column loadable format, each column is persisted to disk individually. This allows for individual columns to be loaded into memory as needed, rather than requiring the entire table to be loaded.

In accordance with an embodiment, a table may be partitioned. These partitions can be declared as corresponding to sets of rows of the table, across the columns of the table. For example, for a table with three columns C1, C2, and C3, and ten rows R1-R10, a first partition P1 partitions the table into rows R1-R5, and a second partition P2 partitions the table into rows R6-R10.

In contrast to being column loadable, a column may instead be page loadable, in accordance with an embodiment. In a page loadable format, a range of rows of a column may be stored in a page.

In accordance with an embodiment, a determination of whether a given column is column loadable or page loadable may be made based on a setting associated with a column, a partition, or an entire table. For example, a load unit setting for a table may apply to all columns of the table. Or, a load unit setting for a given partition may apply to all rows of a column within the partition. And a load unit setting for a column may override other load unit settings.

In order to store a column in a page loadable format, some metadata is needed in order to be able to properly later access the correct data from the pages. For example, if a page is storing rows R6-R10 of a column C3, the metadata would capture this range of rows such that a query needing row R7 of column C3, for example, would know which column page to load into memory.

This page loadable format greatly minimizes the amount of memory typically needed for queries in an in-memory database, as only those pages containing the needed rows are loaded into memory. As such, it is useful to be able to store certain columns, partitions, or even entire tables in a page loadable format.

In short, in a column loadable format, an entire column (along with substructures of the column, such as a dictionary, data vector, and any additional index structures) is only ever fully loaded or fully unloaded into memory. This requires significant amounts of memory for larger columns, although for some mission-critical columns the memory cost may be acceptable. On the other hand, in a page loadable format, a column (and any individual substructures of the column) are loaded and unloaded page-wise. As will be recognized by one skilled in the relevant art, with column data stored in a page loadable format, existing paging algorithms may be used, such as a strategy for evicting pages from memory.

If data for a particular column is less frequently accessed, then it would not be expected that significant amounts of paging in and out of memory would occur (a condition termed 'thrashing', which incurs significant costs in repeated unnecessary disk accesses). In such a case, it may be beneficial to convert less-critical columns (and larger columns) into a page loadable format from a column loadable format.

A column loadable format is, as previously discussed, typically persisted to disk in a binary format that serializes the data within the column. And, as also previously discussed, a page loadable format requires metadata such as, by way of non-limiting example, data regarding the rows of a column stored within a given page. This metadata is not readily available from the column loadable format—for example, an element within a column is only known to be part of a given row once the entire column is read into memory and can be queried to find what element is present at the given row. Therefore, in order to convert from a column loadable format to a page loadable format, a conversion process will need to create this metadata.

This load unit conversion process, when carried out on a column, blocks both Data Description Language (DDL) operations (e.g., CREATE, DROP, and ALTER) and Data Manipulation Language (DML) operations (e.g., INSERT, UPDATE, and DELETE) on the column for the duration of the conversion. As this conversion process may take a long time on large columns (especially since many of the columns such a conversion would be performed on are expected to be large—upwards of terabytes of data in some cases), critical database operations grind to a halt. This renders conversion incompatible with many production systems, without taking down the database temporarily to perform the conversion.

The problem is compounded for tables with many partitions. A load unit conversion (a DDL operation) can be performed by creating a new column (with its own column ID) and transferring the column loadable format data from the original column into a page loadable format for the new column. The table would then be associated with the new column ID for the new column. However, in a partitioned table, each partition references the column ID, so each individual partition must be accessed and modified to reference the new column ID as well. This is the case even if the conversion is performed for only a single partition.

In an embodiment, load unit conversion is provided in-place, eliminating the need to change column IDs. In a further embodiment, the load unit conversion process is performed in a non-blocking manner such that parallel DML operations are allowed. And in an additional embodiment, the load unit conversion can be parallelized across multiple columns at once.

In an exemplary database, performing a DDL operation that modifies a column requires creating a new column, as described above, as a versioning mechanism. This new column is tracked in global metadata, not at a partition level. However, in an embodiment, in-place load unit conversion can be performed on a partition level without updating column metadata across all partitions.

FIG. 1 illustrates a column store architecture 100, in accordance with an embodiment. In this approach, database storage is optimized into a fragment that is quick for write access (a delta fragment), and one that is quick for read access (a main fragment). Modifications to data are held in the delta fragment, such as delta fragment 104a, until they can be merged into the main fragment, such as main fragment 104b.

In accordance with an embodiment, each table in the database has its own corresponding delta fragment 104a and main fragment 104b. In accordance with a further embodiment, tables are partitioned, and each table partition has its own corresponding delta fragment 104a and main fragment 104b.

For example, if a write operation is performed on column C1 of a table (or within a partition in a partitioned table), the system first accesses fragment list 102 in order to identify the available fragments, and determines whether the data being modified already exists in the delta fragment 104a by consulting a column fragment descriptor (CFD) (such as CFD C1 106a or CFD C2 108a) for the appropriate column (in this case CFD C1 106a). If the data is not in the delta fragment, then it can be checked in the main fragment 104b, by consulting its CFDs (such as CFD C1 106b or CFD C2 108b).

A background process can periodically convert data from delta fragment 104a into main fragment 104b for read-optimized access. However, as new data is merged, it is emptied from delta fragment 104a and held in main fragment 104b, which continues to grow. And when a column needs to be queried, a large main fragment 104b (more specifically, a large column stored in main fragment 104b) must be loaded into memory to perform the query.

In the example of FIG. 1, column C1 is converted from column loadable format into page loadable format. To do this, a new column fragment descriptor is introduced for column C1, shown as CFD C1 (ver. 2) 110. As new data is stored to the main fragment 104b for column C1, metadata regarding this new data is placed in CFD C1 (ver. 2) 110. This approach eliminates the need to create an entire new column C1, as CFD C1 (ver. 2) 110 will continue to reference the same column descriptor for column C1 as with CFD C1 106b.

Metadata referencing column IDs for a given column are global, in an embodiment. By maintaining CFD C1 106a for access by active readers, while CFD C1 (ver. 2) 110 is created, it is possible to avoid having to convert global metadata to point to the new column ID for CFD C1 (ver. 2) 110. Having to convert the global metadata would mean having to convert column metadata in each fragment for column C1, including both delta fragment 104a and main fragments 104b for each partition.

Figure 2:
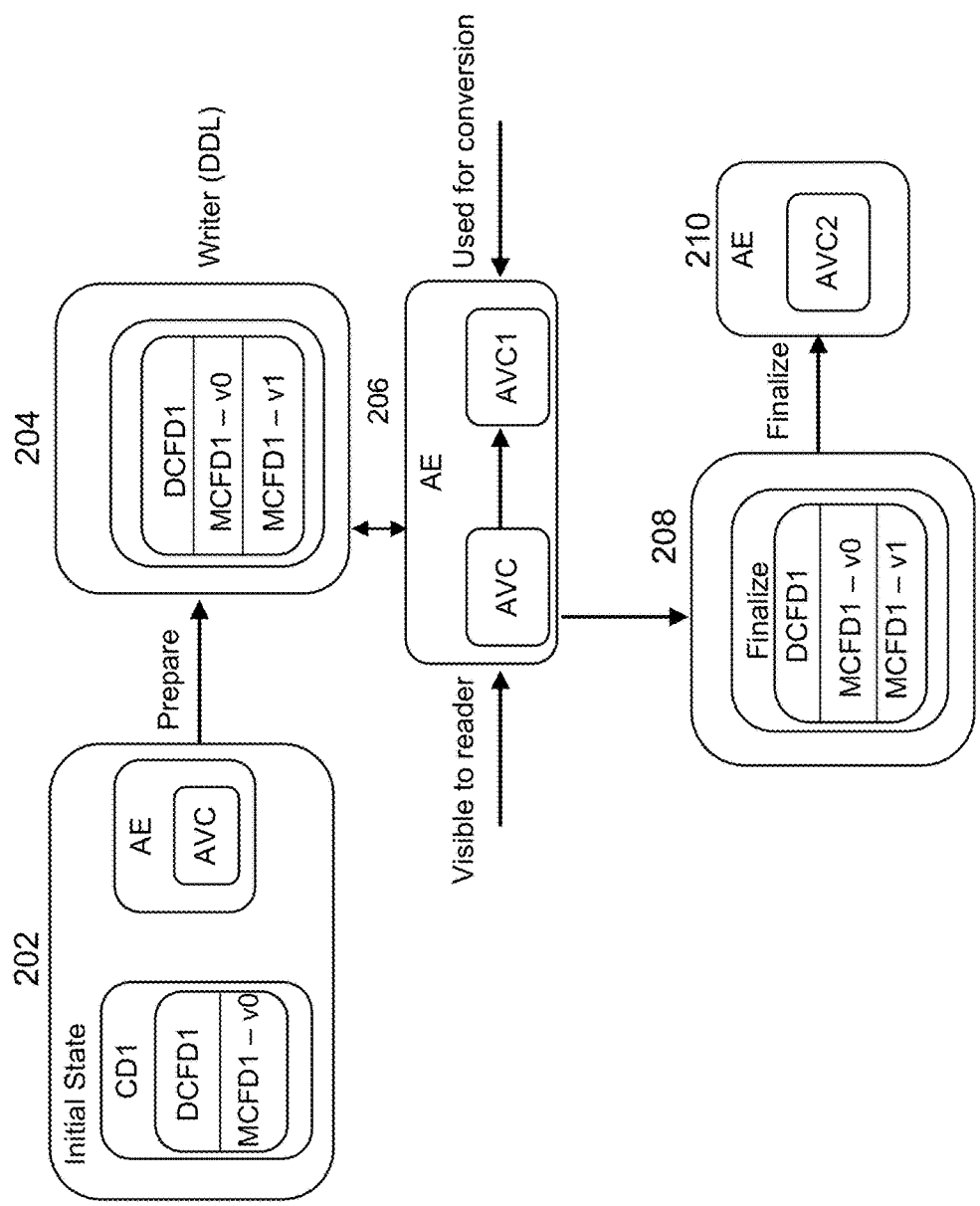
FIG. 2 is a process flow diagram illustrating a process by which a column fragment load unit conversion takes place.

FIG. 2 is a process flow diagram 200 illustrating a process by which a column fragment load unit conversion takes place. The process begins with initial state 202, where a column C1 (referenced by column descriptor CD1) has its corresponding data residing in a delta column fragment (referenced by delta column fragment descriptor DCFD1) and a main column fragment (referenced by main column fragment descriptor MCFD1-v0). As in the above example, the main column fragment referenced by MCFD1-v0 is being converted from a column loadable to a page loadable format. This is done to reduce the memory requirements for column C1 as the majority of data for column C1 is expected to reside within the main column fragment referenced by MCDF1-v0.

The attribute engine (AE) is configured to store column data (such as data for column C1) in an attribute value container (AVC), which is an object that stored in-memory structures for a particular column. One skilled in the relevant arts will appreciate that other memory configurations are usable, and these particular approaches are provided by way of example, and not limitation.

At 204, a new column fragment descriptor corresponding to the main fragment for column 1 is created, as MCFD1-v1, configured to store data in page loadable format. And at 206, the AE is configured to store column data for MCFD1-v1 in a new object AVC1.

At 206, the conversion takes place. Reads to data from column C1 continue to take place at AVC, but the AE converts the column loadable data from AVC by reading it out and placing it in page loadable format into AVC1.

At 208, MCFD1-*v*1 is ready for read access, and at 210 the AE publishes the new page loadable data as AVC2.

Figure 3:
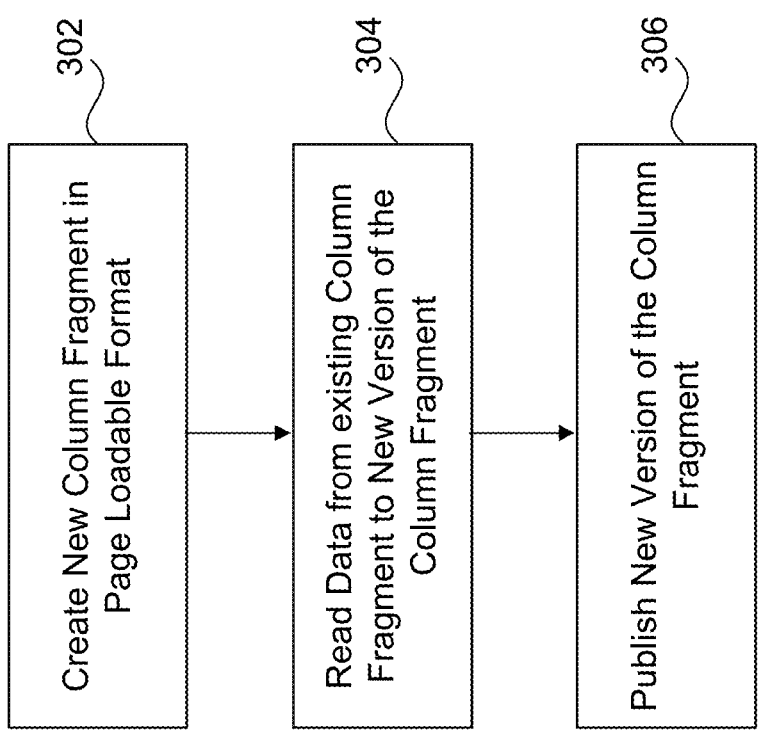
FIG. 3 is a flowchart illustrating steps by which in-place load unit conversion is performed on a column, in accordance with an embodiment.

FIG. 3 is a flowchart 300 illustrating steps by which in-place load unit conversion is performed on a column, in accordance with an embodiment. At step 302, a new column fragment is created in page loadable format. At step 304, a load unit conversion is performed by reading data from the existing column fragment for the column into the new version of the column fragment. And at step 306, when the new version of the column fragment contains all of the data from the existing column fragment, the new version of the column fragment is published for read access.

This conversion process can be performed in parallel, in accordance with an embodiment. For example, multiple threads can be executed in parallel, each handling the load unit conversion for an individual column (or column fragment). In accordance with a further embodiment, individual columns (or column fragments) can be selected for conversion based on the frequency with which they are accessed—as access would require loading the entire column (or column fragment) into memory if not paged. Column size, available resources, and other memory and speed limiting considerations may also be accounted for, in accordance with a further embodiment.

Normally, performing a load unit conversion would require blocking DML operations. As the original column loadable column fragment must be converted into page loadable format in a new version of the column fragment, the column remains readable, but data cannot be modified, added, or deleted. In accordance with an embodiment, DML operations record changes to the delta fragment, such as delta fragment 104*a* of FIG. 1, allowing for a conversion of the main fragment, such as main fragment 104*b* to proceed (e.g., writes to C1 are made to CFD C1 106*a* in the delta fragment, while CFD C1 106*b* is converted to CFD C1 (ver. 2) 110.

However, savepoint operations are blocked for the entire column or entire column fragment while the load unit conversion is carried out on the main fragment. Since the load unit conversion process can be protracted over a large column or large column fragment, allowing parallel savepoint operations to be carried out while the load unit conversion DDL operation is performed is desirable.

Figure 4:
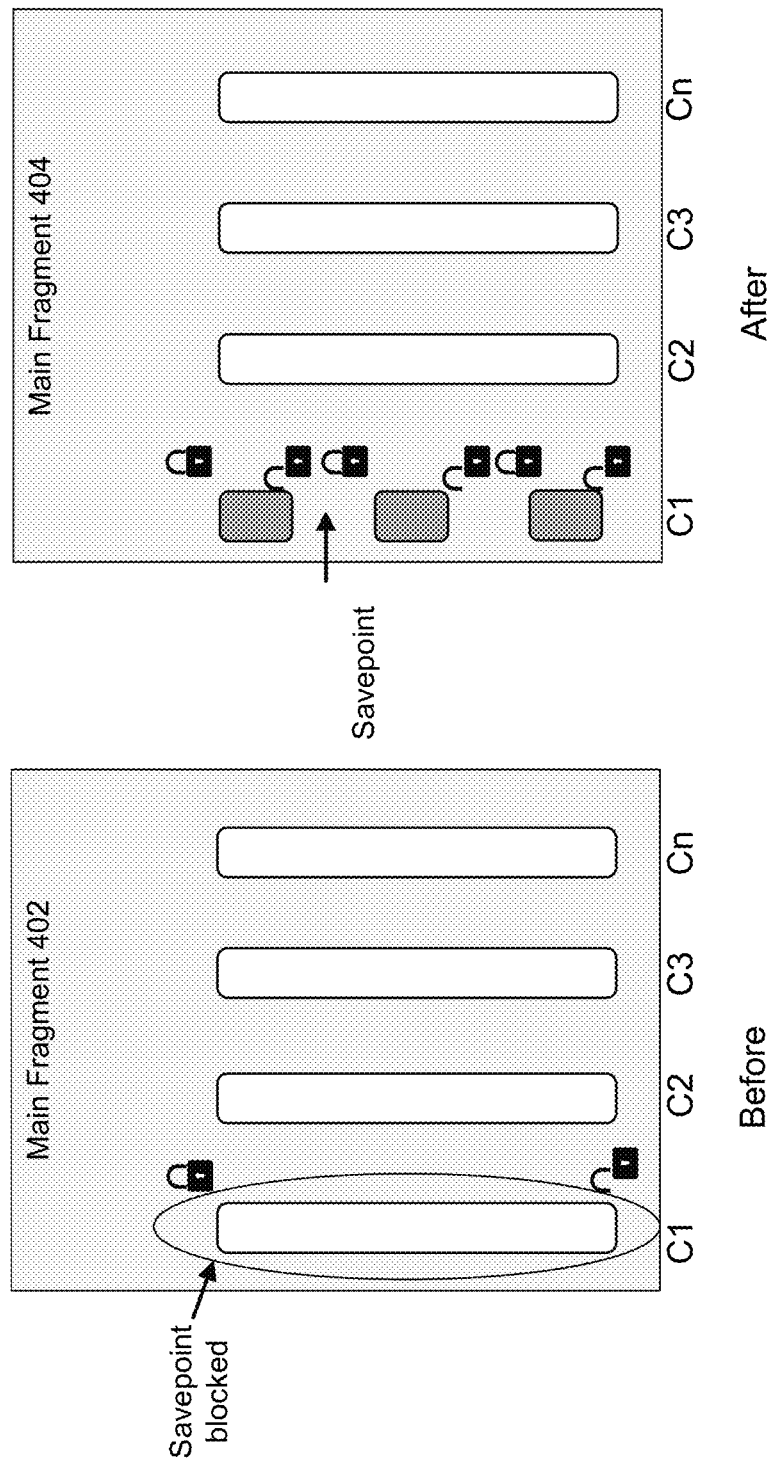
FIG. 4 illustrates a load unit conversion process with parallel savepoint operations, in accordance with an embodiment.

FIG. 4 illustrates a load unit conversion process with parallel savepoint operations, in accordance with an embodiment. As shown in main fragment 402, an entire column (or column fragment) is selected for a load unit conversion process. While this load unit conversion process is performed, any parallel savepoint operations are blocked until the conclusion of the load unit conversion process. This is undesirable, for the reasons stated above.

In an embodiment, the conversion process is implemented as a two-phase process having an exclusive phase and a shared phase. During the exclusive phase, parallel DML operations are not allowed. During this phase, metadata changes are made across the column (or column fragment) to reflect the results of the load unit conversion DDL operation. However, this metadata change requires minimal time, so this blocking behavior is considered acceptable.

During the shared phase, DML operations are permitted as they do not change or update the main fragment data—these DML operations would instead insert news rows in the delta fragment (which would be migrated to the main fragment at a later point). However, parallel savepoint operations are blocked during the shared phase while the conversion is performed. As this operation can be time-consuming for an entire column (or column fragment), the column (or column fragment) is chunked into individual chunks as shown in main fragment 404. Using this approach, parallel savepoint operations can be carried out on the column (or column fragment) without needing to wait for completion of the entire conversion operation. Instead, savepoint operations, being critical to performance, are permitted to execute throughout the conversion operation, only being blocked for the duration that a given chunk is actively being converted. Once conversion of a chunk is completed, any pending savepoint operations can be promptly executed before conversion of a next chunk. Savepoint operations performed on a database can be time sensitive, so reducing the likelihood of an extended blocking period for execution of a savepoint operation is desirable.

Figure 5:
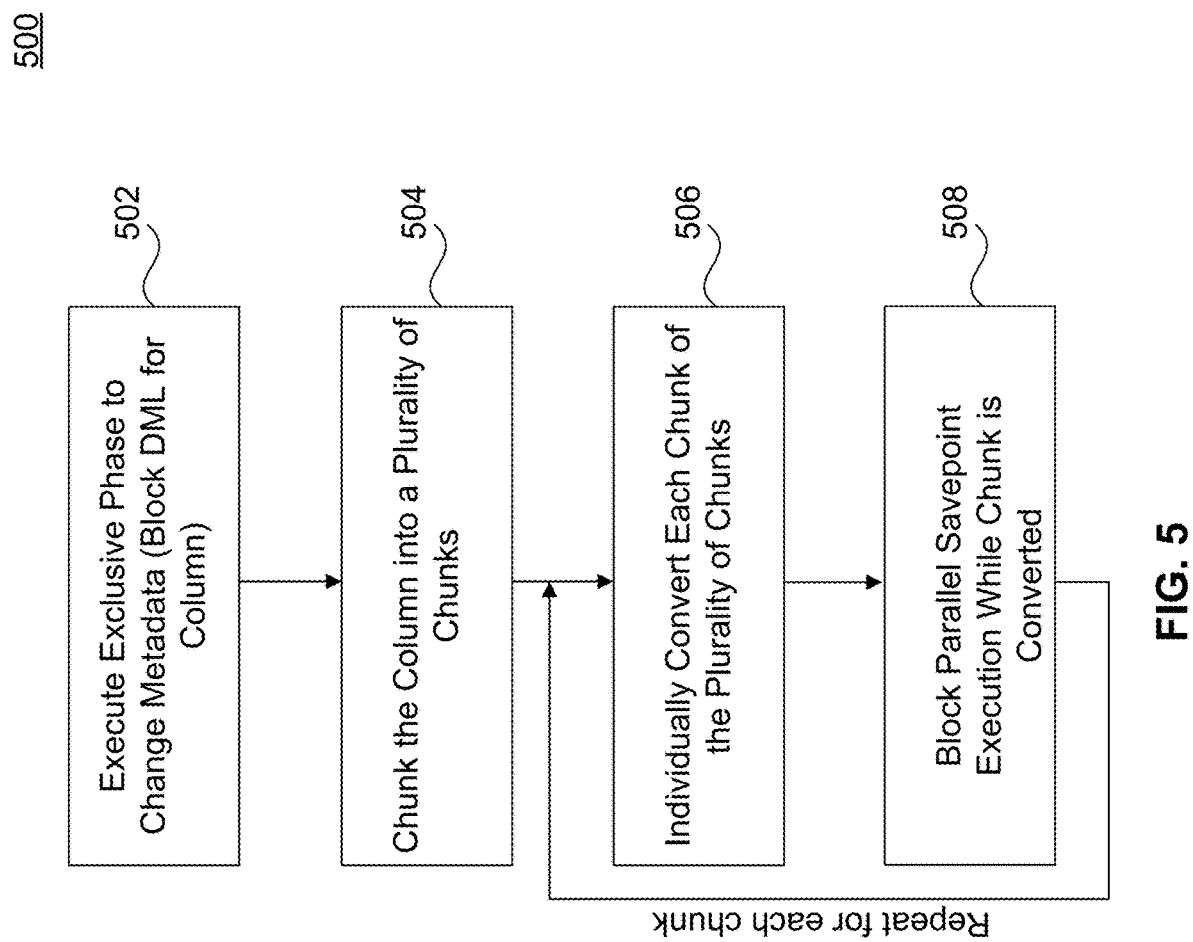
FIG. 5 is a flowchart illustrating steps by which the non-blocking load unit conversion is performed, in accordance with an embodiment.

FIG. 5 is a flowchart 500 illustrating steps by which the non-blocking load unit conversion is performed, in accordance with an embodiment. The process begins at step 502 where metadata for the column (or column fragment) is changed during an exclusive phase—DML operations are locked for the column (or column fragment) during this time, in accordance with an embodiment.

At step 504, a shared phase is executed, in accordance with an embodiment. In this shared phase, savepoint operations are blocked from execution on column data that is being converted. Therefore, at step 504, the column is chunked into a plurality of chunks, in accordance with an embodiment. At step 506, an individual chunk of the plurality of chunks is converted—e.g., data from the column loadable format is read, converted to the page loadable format, and persisted for the given individual chunk. And, at step 508, parallel savepoint execution is blocked from execution while the chunk is being converted. Steps 506 and 508 repeat, as needed, for each chunk. As conversion is completed on a chunk, any blocked savepoints may execute as the conversion process moves on to a different chunk. By way of non-limiting example, a lock that blocks savepoint execution is acquired with the processing of each chunk, and released with the completion of conversion of each chunk, such that savepoints may promptly execute between chunk conversions. With this approach, savepoint blocking may be eliminated altogether, or reduced. And if savepoint blocking does occur, the amount of time spent waiting for a lock to be released on the individual chunk is significantly reduced by comparison to waiting for a lock to be released on the entire column or column fragment to execute a savepoint. One skilled in the relevant arts will appreciate that the granularity of the chunks may be adjusted as needed to balance performance of the conversion algorithm against the likelihood that a savepoint operation will be blocked and the duration of any such block.

Figure 6:
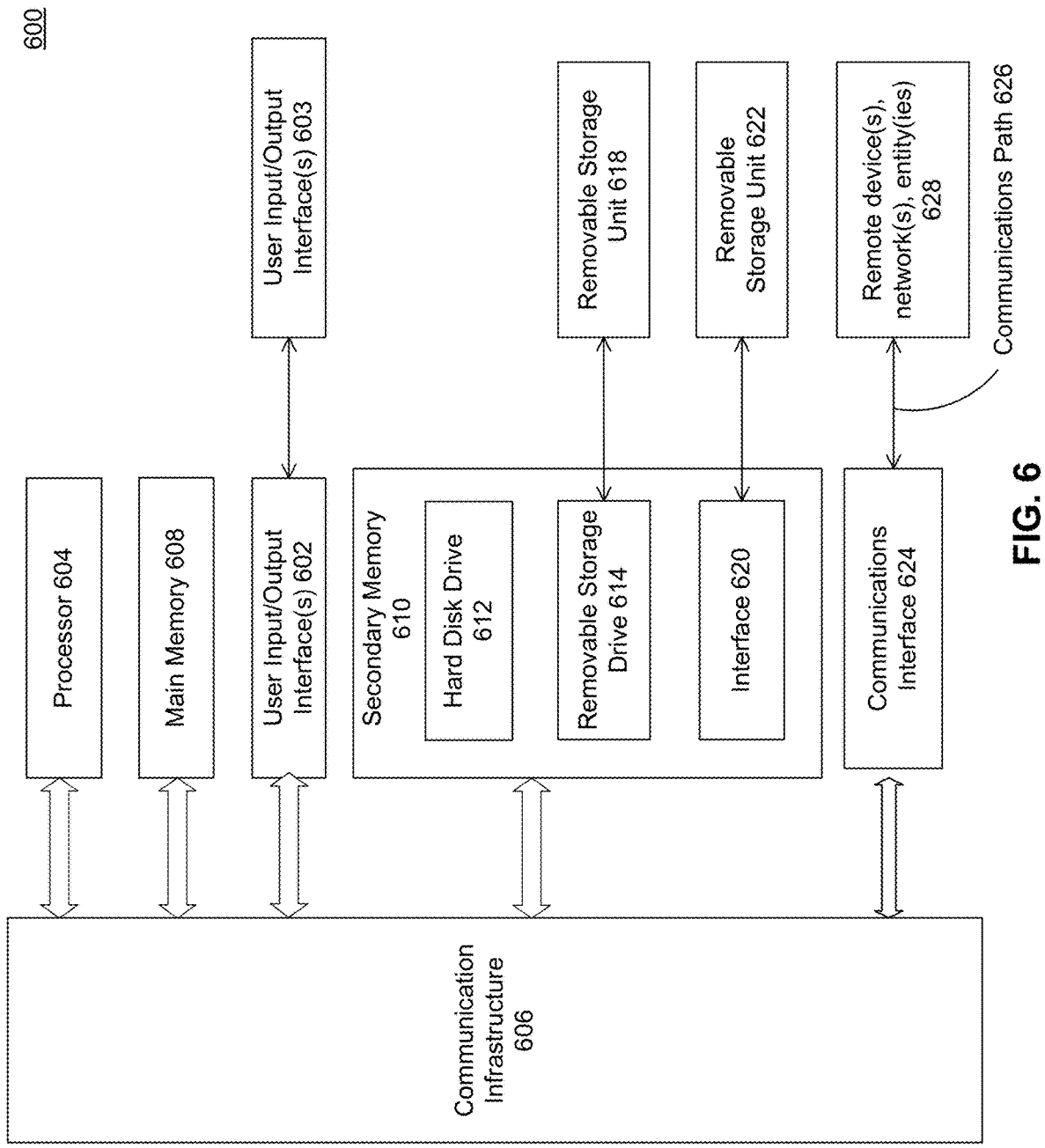
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. as well as non-graphical applications, such as training of machine learning models (e.g., efficient back propagation).

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   selecting a column of a database for conversion from a column loadable format into a page loadable format;
   dividing the column into a plurality of chunks, each chunk comprising a portion of data stored in the column;
   selecting a first chunk of the plurality of chunks for conversion into the page loadable format;
   reading, by one or more computing devices, data from the first chunk in the column loadable format into a memory, wherein the data from the first chunk is blocked from being changed, and wherein a remaining plurality of chunks of the column remain available for updates;
   converting, by the one or more computing devices, the data from the first chunk into the page loadable format;
   persisting, by the one or more computing devices, the data of the first chunk converted to the page loadable format in a new version of the first chunk; and
   publishing, by the one or more computing devices, the new version of the first chunk for access to the data.

2. The computer implemented method of claim 1, wherein the creating, reading, persisting, and publishing are executed on an execution thread, further comprising:
   executing, by the one or more computing devices, an additional execution thread configured to perform load unit conversion on an additional existing column fragment.

3. The computer implemented method of claim 1, wherein the new version of the column fragment and the existing column fragment correspond to a partition of a plurality of partitions of a table.

4. The computer implemented method of claim 1, further comprising:
   executing, by the one or more computing devices, a data manipulation language (DML) operation on the column concurrently with persisting the data converted to the page loadable format in the new version of the column fragment.

5. The computer implemented method of claim 1, further comprising:
   chunking, by the one or more computing devices, the column fragment into a plurality of chunks, wherein the reading and persisting are performed on an individual chunk of the plurality of chunks at a time; and
   blocking, by the one or more computing devices, a parallel savepoint operation from executing during performance of the reading and the persisting on the individual chunk, wherein the parallel savepoint operation is permitted to execute upon completion of the reading and the persisting on the individual chunk.

6. The computer implemented method of claim 1, wherein creating the new version of the column fragment is performed responsive to a determination that the existing column fragment exceeds a memory size.

7. The computer implemented method of claim 1, wherein the creating, reading, persisting, and publishing are executed responsive to a data definition language (DDL) operation.

8. The method of claim 1, further comprising:
   repeating the converting for multiple of the plurality of chunks, including the first chunk.

9. A system, comprising:
   a memory configured to store operations; and
   one or more processors configured to perform the operations, the operations comprising:
   selecting a column of a database for conversion from a column loadable format into a page loadable format;
   dividing the column into a plurality of chunks, each chunk comprising a portion of data stored in the column;
   selecting a first chunk of the plurality of chunks for conversion into the page loadable format;
   reading, by one or more computing devices, data from the first chunk in the column loadable format into a memory, wherein the data from the first chunk is blocked from being changed, and wherein a remaining plurality of chunks of the column remain available for updates;
   converting, by the one or more computing devices, the data from the first chunk into the page loadable format;
   persisting, by the one or more computing devices, the data of the first chunk converted to the page loadable format in a new version of the first chunk; and
   publishing, by the one or more computing devices, the new version of the first chunk for access to the data.

10. The system of claim 9, wherein the creating, reading, persisting, and publishing are executed on an execution thread, the operations further comprising:
   executing an additional execution thread configured to perform load unit conversion on an additional existing column fragment.

11. The system of claim 9, wherein the new version of the column fragment and the existing column fragment correspond to a partition of a plurality of partitions of a table.

12. The system of claim 9, the operations further comprising:
   executing a data manipulation language (DML) operation on the column concurrently with persisting the data converted to the page loadable format in the new version of the column fragment.

13. The system of claim 9, the operations further comprising:
   chunking the column fragment into a plurality of chunks, wherein the reading and persisting are performed on an individual chunk of the plurality of chunks at a time; and blocking a parallel savepoint operation from executing during performance of the reading and the persisting on the individual chunk, wherein the parallel savepoint operation is permitted to execute upon completion of the reading and the persisting on the individual chunk.

14. The system of claim 9, wherein creating the new version of the column fragment is performed responsive to a determination that the existing column fragment exceeds a memory size.

15. The system of claim 9, wherein the creating, reading, persisting, and publishing are executed responsive to a data definition language (DDL) operation.

16. A computer readable storage device having instructions stored thereon, execution of which, by one or more processing devices, causes the one or more processing devices to perform operations comprising:
   selecting a column of a database for conversion from a column loadable format into a page loadable format;
   dividing the column into a plurality of chunks, each chunk comprising a portion of data stored in the column;
   selecting a first chunk of the plurality of chunks for conversion into the page loadable format;
   reading, by one or more computing devices, data from the first chunk in the column loadable format into a memory, wherein the data from the first chunk is blocked from being changed, and wherein a remaining plurality of chunks of the column remain available for updates;
   converting, by the one or more computing devices, the data from the first chunk into the page loadable format;
   persisting, by the one or more computing devices, the data of the first chunk converted to the page loadable format in a new version of the first chunk; and
   publishing, by the one or more computing devices, the new version of the first chunk for access to the data.

17. The computer readable storage device of claim 16, wherein the creating, reading, persisting, and publishing are executed on an execution thread, the operations further comprising:
   executing an additional execution thread configured to perform load unit conversion on an additional existing column fragment.

18. The computer readable storage device of claim 16, wherein the new version of the column fragment and the existing column fragment correspond to a partition of a plurality of partitions of a table.

19. The computer readable storage device of claim 16, the operations further comprising:
   executing a data manipulation language (DML) operation on the column concurrently with persisting the data converted to the page loadable format in the new version of the column fragment.

20. The computer readable storage device of claim 16, the operations further comprising:
   chunking the column fragment into a plurality of chunks, wherein the reading and persisting are performed on an individual chunk of the plurality of chunks at a time; and
   blocking a parallel savepoint operation from executing during performance of the reading and the persisting on the individual chunk, wherein the parallel savepoint operation is permitted to execute upon completion of the reading and the persisting on the individual chunk.

* * * * *